United States Patent
Hirata

(10) Patent No.: US 9,082,553 B2
(45) Date of Patent: Jul. 14, 2015

(54) LAMINATED CERAMIC CAPACITOR AND MANUFACTURING METHOD THEREFOR

(71) Applicant: MURATA MANUFACTURING CO., LTD., Nagaokakyo-Shi, Kyoto-fu (JP)

(72) Inventor: Tomotaka Hirata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 217 days.

(21) Appl. No.: 13/852,026

(22) Filed: Mar. 28, 2013

(65) Prior Publication Data

US 2013/0208402 A1 Aug. 15, 2013

Related U.S. Application Data

(63) Continuation of application No. PCT/JP2012/074865, filed on Sep. 27, 2012.

(30) Foreign Application Priority Data

Sep. 29, 2011 (JP) ................................ 2011-214884

(51) Int. Cl.
*H01G 4/12* (2006.01)
*H01G 4/30* (2006.01)
(Continued)

(52) U.S. Cl.
CPC ............ *H01G 4/1236* (2013.01); *C04B 35/486* (2013.01); *H01G 4/232* (2013.01);
(Continued)

(58) Field of Classification Search
CPC ............ H01G 4/06; H01G 4/08; H01G 4/10; H01G 4/12; H01G 4/1236; H01G 4/1263

USPC ............ 361/301.4, 311, 321.1, 321.4, 321.5; 29/25.41

See application file for complete search history.

(56) References Cited

U.S. PATENT DOCUMENTS 4,835,656 A * 5/1989 Kitahara et al. ............ 361/321.3
2001/0039239 A1 * 11/2001 Motoki et al. ................ 501/136
(Continued)

FOREIGN PATENT DOCUMENTS

JP 3-182244 8/1991
JP 11-106259 A 4/1999
(Continued)

OTHER PUBLICATIONS

Taira Ogita et al., "Laser Bonding of Hydroxyapatite Ceramics" Transactions of the Japan Society of Mechanical Engineers, Series C, Jun. 21, 2011, vol. 77 No. 774.
(Continued)

*Primary Examiner* — Dion R Ferguson
(74) *Attorney, Agent, or Firm* — Arent Fox LLP

(57) ABSTRACT

A laminated ceramic capacitor that includes a laminated body including dielectric ceramic layers having crystal grains and crystal grain boundaries, and including internal electrode layers. An external electrode is formed on a surface of the laminated body, and is electrically connected to the internal electrode layers exposed at the surface of the laminated body. The laminated body has a composition including a calcium zirconate based perovskite-type compound as a main constituent, and further including Mn, Sr, and Si. When the laminated body is dissolved, the Si contained therein is 0.1 parts by mol or more and 10 parts by mol or less with respect to 100 parts by mol of Zr, and the molar ratio of Mn to Sr is 0.3 or more and 3.2 or less.

10 Claims, 1 Drawing Sheet

(51) Int. Cl.
*H01G 4/232* (2006.01)
*C04B 35/486* (2006.01)
*H01G 13/04* (2006.01)
*H01B 3/12* (2006.01)

(52) U.S. Cl.
CPC ............... *H01G 4/30* (2013.01); *H01G 13/04* (2013.01); *C04B 2235/3203* (2013.01); *C04B 2235/3208* (2013.01); *C04B 2235/3213* (2013.01); *C04B 2235/3215* (2013.01); *C04B 2235/3217* (2013.01); *C04B 2235/3232* (2013.01); *C04B 2235/3262* (2013.01); *C04B 2235/3409* (2013.01); *C04B 2235/3418* (2013.01); *C04B 2235/652* (2013.01); *C04B 2235/6584* (2013.01); *C04B 2235/768* (2013.01); *C04B 2235/77* (2013.01); *C04B 2235/9692* (2013.01); *H01B 3/12* (2013.01)

(56) References Cited

U.S. PATENT DOCUMENTS

2010/0049179 A1   2/2010   Kanaoka et al.
2011/0038096 A1*  2/2011   Naito et al. ................ 361/321.4

FOREIGN PATENT DOCUMENTS

| JP | 2002-134350 A | 5/2002 |
| JP | 2005-213070 A | 8/2005 |
| JP | 2007-250995 A | 9/2007 |
| JP | 2011-187560 A | 9/2011 |
| WO | WO 2008-023708 A1 | 2/2008 |

OTHER PUBLICATIONS

PCT/JP2011/074865 International Search Report dated Dec. 20, 2011.
PCT/JP2012/074865 Written Opinion dated Dec. 27, 2012.

* cited by examiner

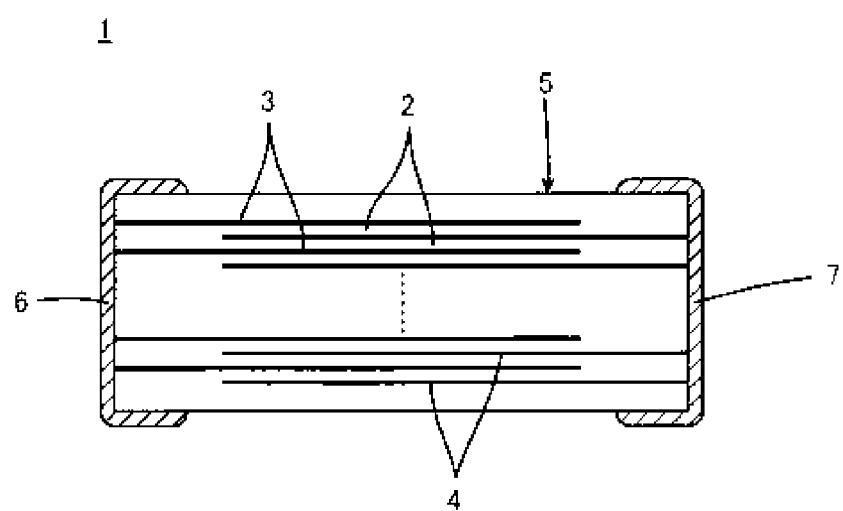

LAMINATED CERAMIC CAPACITOR AND MANUFACTURING METHOD THEREFOR

CROSS REFERENCE TO RELATED APPLICATIONS

The present application is a continuation of International application No. PCT/JP2012/074865, filed Sep. 27, 2012, which claims priority to Japanese Patent Application No. 2011-214884, filed Sep. 29, 2011, the entire contents of each of which are incorporated herein by reference.

BACKGROUND OF THE INVENTION

1. Field of the Invention

This invention relates to a dielectric ceramic and a laminated ceramic capacitor, and more particularly, relates to a laminated ceramic capacitor for use in temperature compensation of an electric circuit.

2. Description of the Related Art

Laminated ceramic capacitors for use in temperature compensation of electronic circuits require linearity with a specific slope for temperature curve of electrostatic capacitance.

In addition, with the development of electronics technology in recent years, the reduction in size and high reliability have been required for laminated ceramic capacitors.

In these laminated ceramic capacitors for temperature compensation, dielectric ceramics containing a calcium zirconate based material as its main constituent are used in some cases. For example, JP 11-106259 A discloses a laminated ceramic capacitor using a dielectric ceramic composition including a composite oxide represented by $(CaO)_x(Zr_{1-y} \cdot Ti_y)O_2$, and including, with respect to 100 parts by weight of the composite oxide, 1.0 to 3.0 parts by weight of an Mn compound in terms of $MnCO_3$ and 0.5 to 2.0 parts by weight of a glass component represented by $(aLi_2O$-$bB_2O_3$-$cCaO)$, where x has a value of 0.95 to 1.05, y has a value of 0.01 to 0.10, a has a value of 25 to 45, b has a value of 45 to 65, c has a value of 5 to 20, and a+b+c=100.

SUMMARY OF THE INVENTION

However, the laminated ceramic capacitor disclosed in JP 11-106259 A has the problem of degraded moisture resistance, in particular, when the dielectric ceramic is reduced in layer thickness.

Therefore, an object of this invention is to provide a laminated ceramic capacitor configured with the use of a dielectric ceramic which can solve the problem as described above, and a method for manufacturing the laminated ceramic capacitor.

More specifically, the present invention provides a laminated ceramic capacitor including: a laminated body which includes dielectric ceramic layers including crystal grains and crystal grain boundaries, and includes internal electrode layers; and an external electrode formed on a surface of the laminated body, and electrically connecting the internal electrode layers exposed at the surface of the laminated body, wherein the laminated body has a composition including a calcium zirconate based perovskite-type compound as a main constituent, and further including Mn, Sr, and Si, and when the laminated body is dissolved, Si contained is 0.1 parts by mol or more and 10 parts by mol or less with respect to 100 parts by mol of Zr, and the molar ratio of Mn to Sr is 0.3 or more and 3.2 or less.

In addition, the present invention provides a laminated ceramic capacitor including: a laminated body which includes dielectric ceramic layers including crystal grains and crystal grain boundaries, and includes internal electrode layers; and an external electrode formed on a surface of the laminated body, and electrically connecting the internal electrode layers exposed at the surface of the laminated body, wherein the dielectric ceramic layers have a composition including a calcium zirconate based perovskite-type compound as a main constituent, and further including Mn, Sr, and Si, and the dielectric ceramic layers have a composition in which Si contained is 0.1 parts by mol or more and 10 parts by mol or less with respect to 100 parts by mol of Zr, and the molar ratio of Mn to Sr is 0.3 or more and 3.2 or less.

In addition, a main constituent of the internal electrode layer is preferably Cu.

Furthermore, the present invention is also directed to a method for manufacturing a laminated ceramic capacitor.

In a method for manufacturing a laminated ceramic capacitor, which includes the steps of: preparing a main constituent powder containing a calcium zirconate based perovskite-type compound as its main constituent; preparing a Mn compound, a Sr compound, and a Si compound, mixing the main constituent powder, the Mn compound, the Sr compound, and the Si compound, and then obtaining ceramic slurry; obtaining ceramic green sheets from the ceramic slurry; stacking the ceramic green sheets and internal electrode layers to obtain an unfired laminated body; and firing the unfired laminated body to obtain a laminated body, wherein Si contained is 0.1 parts by mol or more and 10 parts by mol or less with respect to 100 parts by mol of Zr, and the molar ratio of Mn to Sr is 0.3 or more and 3.2 or less.

In the case of the laminated ceramic capacitor according to the present invention, the moisture resistance is improved. Specifically, the laminated ceramic capacitor exhibits favorable lifetime characteristics in a load test under high temperature and high humidity.

BRIEF DESCRIPTION OF THE DRAWINGS

FIG. 1 is a cross-sectional view schematically illustrating a laminated ceramic capacitor 1 configured with the use of a dielectric ceramic according to this invention.

DETAILED DESCRIPTION OF THE INVENTION

With reference to FIG. 1, an example of a laminated ceramic capacitor 1 will be first described to which a dielectric ceramic according to this invention is applied.

The laminated ceramic capacitor 1 includes a laminated body 5 configured with the use of a plurality of dielectric ceramic layers 2 stacked and a plurality of internal electrodes 3 and 4 formed along the interfaces between the dielectric ceramic layers 2. The internal electrodes 3 and 4 contain, for example, Cu as a main constituent.

First and second external electrodes 6 and 7 are formed in different positions from each other on the outer surface of the laminated body 5. The external electrodes 6 and 7 contain, for example, Ag or Cu as their main constituent. Although not shown, a plating film is formed on the external electrodes 6 and 7, if necessary. The plating film is composed of, for example, a Ni plating film and a Sn plating film formed thereon.

The laminated ceramic capacitor 1 shown in FIG. 1 has the first and second external electrodes 6 and 7 formed on the respective end surfaces of the capacitor main body 5 opposed to each other. The internal electrodes 3 and 4 include a plurality of first internal electrodes 3 electrically connected to the first external electrode 6, and a plurality of second internal electrodes 4 electrically connected to the second external electrode 7, and these first and second internal electrodes 3 and 4 are arranged alternately in the stacking direction.

It is to be noted that the laminated ceramic capacitor 1 may be a two-terminal type capacitor including the two external electrodes 6 and 7, or may be a multi-terminal type capacitor including a number of external electrodes.

In this laminated ceramic capacitor 1, it is the dielectric ceramic layers 2 including crystal grains and crystal grain boundaries that constitute a large portion of the laminated body 5, and the dielectric ceramic layers 2 are basically an oxide ceramic.

The composition of the laminated body 5, preferably the composition of the dielectric ceramic layers 2 contains, as its main constituent, a calcium zirconate based perovskite-type compound, and further contains Mn, Sr, and Si.

More specifically, most of the crystal grains are mainly composed of a calcium zirconate. If necessary, some of the zirconium may be substituted with titanium. In this case, desirably, the molar ratio of Zr/(Ti+Zr) is preferably greater than 0.5.

It can be confirmed by a method such as, for example, XRD that the main constituent of the laminated body 5, or the main constituent of the dielectric ceramic layers 2 is a calcium zirconate based perovskite-type compound.

In addition, the main constituent of the laminated body 5, or the main constituent of the dielectric ceramic layers 2 contains Mn, Sr, and Si as accessory constituents. These accessory constituents are not limited in terms of existence form. For example, the accessory constituents may be present as oxides such as MnO at crystal grain boundaries or triple points, or may form secondary phase grains as composite oxides containing multiple elements. In addition, the accessory constituents may partially present in the crystal grains.

It is to be noted that as for the content ratio for each element in the composition of the laminated body 5, the laminated body can be dissolved, and subjected to quantitative analysis by, for example, ICP (inductively-coupled plasma emission spectrometry). Essentially, the composition of only the dielectric ceramic layers 2 is preferably defined. However, it is only necessary to define the composition of the laminated body 5 because the electric capacitance forming portions of the dielectric ceramic layers 2 account for most of the laminated body 5 as mentioned previously.

More specifically, as for the contents for each element, Si contained is 0.1 parts by mol or more and 10 parts by mol or less with respect to 100 parts by mol of Zr. When the content of Si is excessively low, sintering will be likely to be insufficient, and pores will be likely to be produced in the dielectric ceramic layers. As a result, the moisture resistance will be likely to be decreased. On the other hand, when the content of Si is excessively high, a coarse secondary phase will be likely to be generated, which is likely to decrease the moisture resistance.

In addition, the molar ratio of Mn/Sr is 0.3 or more and 3.2 or less. When this ratio is excessively low, sintering will be likely to be insufficient, and pores will be likely to be produced in the dielectric ceramic layers. As a result, the moisture resistance will be likely to be decreased. Alternatively, when this ratio is excessively high, the Mn will decrease the stability of a glass component mainly containing Si, moisture will dissolve the glass component, and as a result, the moisture resistance will be likely to be decreased. More specifically, when the molar ratio of Mn/Sr falls within the range of 0.3 or more and 3.2 or less, the moisture resistance is improved most, probably because a glass component mainly including Si is present in the most stable manner.

It is to be noted that when the main constituent of the internal electrode layers is Cu, the advantageous effect of the present invention, that is, the effect of improvement in moisture resistance stands out most. This is believed to be because Cu is likely to diffuse into the dielectric ceramic and glass as compared with Ni, and the diffusing Cu plays a role like a catalyst to promote the crystallization of the glass. Next, a method for manufacturing the laminated ceramic capacitor will be described below.

First, a main constituent powder is prepared which contains, as its main constituent, a calcium zirconate based perovskite-type compound.

For example, a method is conceivable in which a Ca compound and a Zr compound are mixed, and undergo a synthesis to obtain a calcium zirconate. Specific examples include a solid-phase synthesis method, that is, a method in which a $CaCO_3$ powder and a $ZrO_2$ powder are mixed, and subjected to a heat treatment. Besides, wet synthesis methods are also preferred such as a hydrothermal synthesis method, a hydrolysis method, and an oxalic acid method.

Next, a Mn compound, a Sr compound, and a Si compound are prepared which serve as accessory constituents. These compounds are not particularly limited in terms of their forms, and may be oxide powders or carbonate powders, or may be sols or organic metals.

Then, the main constituent powder, the Mn compound, the Sr compound, and the Si compound are mixed. In this case, other elements may be further mixed as accessory constituents. In addition, the accessory constituents are not to be considered particularly limited in terms of their mixture form. For example, multiple accessory constituents may be mixed in advance, and further undergo a synthesis through a heat treatment. Alternatively, specific accessory constituents may be mixed in two or more stages.

A binder, etc. may be mixed with ceramic slurry obtained when the accessory constituents are mixed in the main constituent powder, before proceeding to sheet forming. Alternatively, the accessory constituents may be mixed in the main constituent powder, and then subjected to drying to obtain a ceramic raw material, and then, the ceramic raw material may be mixed again with a solvent to obtain ceramic slurry. If necessary, the ceramic raw material powder may be subjected to a heat treatment to react the main constituent powder with the accessory constituents.

Next, this ceramic slurry is subjected to sheet forming to obtain ceramic green sheets. The ceramic green sheets and internal electrode layers are stacked to obtain an unfired laminated body. Specifically, reference is made to a method in which a conductive paste including metal particles to serve as a component of internal electrodes and an organic vehicle is formed by application thereof onto the surfaces of the ceramic green sheets, and these ceramic green sheets are stacked so as to alternate the directions of extracting the internal electrodes, and subjected to pressure bonding.

The obtained raw laminated body is subjected to, after removing the binder, firing under an atmosphere that exhibits an oxygen partial pressure to such an extent that the internal electrodes are not oxidized, whereas the dielectric is not reduced. This firing provides the laminated body 5, which includes the dielectric ceramic 2 including crystal grains and crystal grain boundaries, and the internal electrodes 3 and 4.

External electrodes are formed on sections of the laminated body 5 at which the internal electrode layers are exposed, thereby providing the laminated ceramic capacitor 1. Further, methods for the formation of the external electrodes include a method in which a conductive paste is formed in advance by application thereof onto the surface of the unfired laminated body, and subjected to firing at the same time as the firing for the laminated body.

EXAMPLES

An experimental example will be described below which was carried out in accordance with this invention.

(A) Preparation of Ceramic Powder

First, respective powders of high-purity $CaCO_3$ and $ZrO_2$ were prepared and blended as starting raw materials for $CaZrO_3$ as a main constituent. The $CaCO_3$ and $ZrO_2$ were weighed at a molar ratio of 1:1.

Next, this blended powder was subjected to wet mixing in a ball mill to be dispersed uniformly, and then subjected to a drying treatment to obtain an adjusted powder. Then, the adjusted powder obtained was subjected to calcination at 1,200° C. to obtain a main constituent powder.

On the other hand, respective powders of MnO, SrO, $SiO_2$, CaO, BaO, $Li_2O$, $B_2O_3$, $Al_2O_2$, $TiO_2$ were prepared as accessory constituents.

Next, these respective powders were weighed so as to provide the contents of Mn, Sr, Si, Ca, Ba, Li, B, Al, and Ti with respect to 100 parts by mol of Zr in the main constituent powder as shown in Table 1, and added to the main constituent powder described previously to obtain a mixed powder.

Next, a conductive paste containing a Cu powder was applied by screen printing onto the ceramic green sheets, thereby forming conductive paste films to serve as internal electrodes.

Next, the multiple ceramic green sheets with the conductive paste films formed were stacked in such a way that the sides were alternated to which the conductive paste films were extracted, thereby providing a raw laminated body to serve as a capacitor main body.

Next, this laminated body was heated at a temperature of 240° C. for 3 hours in an $N_2$ atmosphere to burn the binder, and then fired at 900 to 1,000° C. for 2 hours in a reducing atmosphere composed of a $H_2$—$N_2$—$H_2O$ gas with an oxygen partial pressure of $10^{-9}$ to $10^{-12}$ MPa to obtain a sintered laminated body.

This laminated body was dissolved, and subjected to an ICP analysis to confirm that the compositions of the ceramic green sheets were maintained substantially, except for Cu as an internal electrode constituent.

Next, the implementation of XRD structural analysis for this laminated body revealed that the main constituent had a calcium zirconate based perovskite-type structure.

Next, a Cu paste containing glass frit was applied onto both end surfaces of the capacitor main body described above, and fired at a temperature of 850° C. in an $N_2$ atmosphere to form external electrodes electrically connected to the internal electrodes. Furthermore, a Ni plating film, and further a Sn plating film were formed by electrolytic barrel plating onto the sur-

TABLE 1

| Sample Number | Parts by Mol to 100 Parts by mol of Zr | | | | | | | | | | Mn/Sr ratio |
|---|---|---|---|---|---|---|---|---|---|---|---|
| | Mn | Si | Mg | Ca | Sr | Ba | Li | B | Al | Ti | |
| 1 | 10.0 | 3.47 | 0 | 5.79 | 2.05 | 0 | 6.12 | 5.4 | 0 | 0 | 4.9 |
| 2 | 10.0 | 3.47 | 0 | 5.79 | 3.10 | 0 | 6.12 | 5.4 | 0 | 0 | 3.2 |
| 3 | 0.10 | 10.0 | 0 | 34.6 | 0.34 | 0 | 37.8 | 34.4 | 0 | 0 | 0.3 |
| 4 | 0.10 | 10.0 | 0 | 34.6 | 0.50 | 0 | 37.8 | 34.4 | 0 | 0 | 0.2 |
| 5 | 0.15 | 10.0 | 0 | 18.7 | 0.05 | 0 | 20.4 | 18.6 | 0 | 0 | 3.0 |
| 6 | 0.15 | 10.0 | 0 | 18.7 | 0.00 | 0 | 20.4 | 18.6 | 0 | 0 | — |
| 7 | 0 | 10.0 | 0 | 34.6 | 0.50 | 0 | 37.8 | 34.4 | 0 | 0 | 0.0 |
| 8 | 6.0 | 3.47 | 0 | 5.79 | 3.0 | 0 | 6.12 | 10.8 | 0 | 0 | 2.0 |
| 9 | 6.0 | 0.00 | 0 | 5.79 | 3.0 | 0 | 6.12 | 10.8 | 0 | 0 | 2.0 |
| 10 | 5.0 | 8.57 | 0 | 18.7 | 5.0 | 0 | 20.4 | 18.6 | 0 | 0 | 1.0 |
| 11 | 1.5 | 10.0 | 0 | 28.0 | 0.80 | 0 | 44.1 | 40.2 | 0 | 0 | 1.9 |
| 12 | 3.0 | 10.0 | 0 | 0 | 3.0 | 12.2 | 9.2 | 24.5 | 0 | 0 | 1.0 |
| 13 | 3.0 | 8.57 | 0.55 | 1.22 | 3.0 | 8.9 | 10.0 | 24.2 | 2.7 | 0 | 1.0 |
| 14 | 3.0 | 8.57 | 0.04 | 0.08 | 3.0 | 0.59 | 0.66 | 1.6 | 0 | 0 | 1.0 |
| 15 | 3.0 | 8.57 | 0 | 2.65 | 3.0 | 3.5 | 52.4 | 24.2 | 0.18 | 1.7 | 1.0 |
| 16 | 10.0 | 0.10 | 0 | 0.08 | 3.5 | 0 | 0.66 | 1.6 | 2.2 | 0.11 | 2.9 |
| 17 | 10.0 | 8.57 | 0 | 5.79 | 3.1 | 0 | 0 | 0 | 0 | 0 | 3.2 |
| 18 | 4.5 | 3.47 | 0 | 5.79 | 3.0 | 0 | 7.1 | 0 | 0 | 0 | 1.5 |
| 19 | 4.5 | 3.47 | 0 | 5.79 | 3.0 | 0 | 0 | 10.2 | 0 | 0 | 1.5 |
| 20 | 4.5 | 3.47 | 0 | 5.79 | 3.0 | 0 | 5.0 | 7.6 | 0 | 0 | 1.5 |
| 21 | 9.2 | 0.10 | 0 | 5.79 | 5.0 | 0 | 5.0 | 7.6 | 0 | 0 | 1.8 |
| 22 | 3.0 | 15.1 | 0 | 5.79 | 3.0 | 0 | 5.0 | 7.6 | 0 | 0 | 1.0 |

(B) Preparation of Laminated Ceramic Capacitor

Next, this mixed powder with an organic solvent and a dispersant added thereto was subjected to wet mixing in a ball mill to be dispersed uniformly. Furthermore, a polyvinyl butyral based binder and a plasticizer were added and mixed to obtain ceramic slurry.

Then, this ceramic slurry was subjected to sheet forming in accordance with a lip method to obtain ceramic green sheets in a rectangular shape.

Samples were taken from these ceramic green sheets, and subjected to a composition analysis of inorganic constituents by ICP to confirm that the blended compositions shown in Table 1 were maintained substantially.

faces of the external electrodes. In this way, obtained were laminated ceramic capacitors according to each sample.

The laminated ceramic capacitors thus obtained had outer dimensions of 0.6 mm in length, 0.3 mm in width, and 0.3 mm in thickness, and the dielectric ceramic layers interposed between the internal electrodes had a thickness of 3 μm. In addition, the number of effective dielectric ceramic layers was 50, and the area of the electrode opposed per dielectric ceramic layer was 0.0718 $mm^2$.

(C) Characterization

Next, the laminated ceramic capacitors according to each sample were evaluated as follows.

(1) Q Value

At 1 Vrms and 1 MHz, the tan δ was measured, and the reciprocal thereof was regarded as a Q value.

(2) Temperature Coefficient of Electrostatic Capacitance

With the electrostatic capacitance $C_{20}$ at 20° C. as a reference, the temperature coefficient A of electrostatic capacitance $C_T$ at each of two temperatures $T_T$ of −55° C. and 125° C. were obtained with the use of the following formulas.

$$A=(C_T-C_{20})/C_{20}(T_T-20)\times 10^{-6} \text{ (ppm./° C.)}$$

(3) Porosity in Sintered Body

The polished surface with contamination removed therefrom by ion milling was observed at 3,500-fold magnification with the use of FE-SEM, and the SEM image was subjected to binarization into light and dark to figure out the porosity.

(4) Porosity after Immersion in Acid

The sintered body was polished, then immersed in 0.1 N hydrochloric acid for 16 hours in an environment at a temperature of 85° C. and a humidity of 85%, and thereafter, subjected to SEM observation by the same method as in the evaluation (3) to figure out the porosity.

(5) Percent Defective in High Temperature Load Test

A direct-current voltage of 100 V was applied to 100 pieces of the laminated ceramic capacitors at 150° C. for 1,000 hours, and the insulation resistance was then measured for the laminated ceramic capacitors. When the insulation resistance value for each laminated ceramic capacitor was $10^{11}\Omega$ or less, the laminated ceramic capacitor was regarded as a defective, and the incidence of defectives was figured out.

(6) Evaluation of Moisture Resistance by PCBT Test

A direct-current voltage of 25 V was applied to 72 pieces of the laminated ceramic capacitors at a temperature of 125° C., a pressure of 1.2 atmospheres, and a humidity of 95% for 500 hours, and the insulation resistance was then measured for the laminated ceramic capacitors. When the insulation resistance value for each laminated ceramic capacitor was $10^{11}\Omega$ or less, the laminated ceramic capacitor was regarded as a defective, and the incidence of defectives was figured out.

Table 2 shows the results of the evaluations (1) to (6) described above.

TABLE 2

| Sample Number | Q | Electrostatic Capacitance Coefficient A [ppm/° C.] −55° C. | 125° C. | Porosity after Firing [%] | Porosity after Immersion in 0.1N Hydrochloric Acid [%] | Percent Defective after High Temperature Load Test [%] | Percent Defective after PCBT |
|---|---|---|---|---|---|---|---|
| 1 | >10000 | 2 | 16 | 0.1 | 2.5 | 0 | 8.3 |
| 2 | >10000 | 1 | 13 | 0.1 | 0.1 | 0 | 0 |
| 3 | >10000 | 3 | 14 | 0.1 | 0.1 | 0 | 0 |
| 4 | 1500 | 5 | 20 | 0.7 | 2.4 | 0 | 6.9 |
| 5 | >10000 | 4 | 18 | 0.1 | 0.1 | 0 | 0 |
| 6 | >10000 | 2 | 10 | 0.1 | 1.6 | 0 | 4.2 |
| 7 | 800 | −6 | 8 | 0.8 | 1.9 | 8 | 5.6 |
| 8 | >10000 | 7 | 28 | 0.1 | 0.1 | 0 | 0 |
| 9 | 1000 | −12 | −1 | 1.8 | 5.1 | 18 | 20.8 |
| 10 | >10000 | −8 | 3 | 0.1 | 0.1 | 0 | 0 |
| 11 | >10000 | 2 | 16 | 0.1 | 0.1 | 0 | 0 |
| 12 | >10000 | 1 | 15 | 0.1 | 0.1 | 0 | 0 |
| 13 | >10000 | 3 | 17 | 0.1 | 0.1 | 0 | 0 |
| 14 | >10000 | 5 | 19 | 0.1 | 0.1 | 0 | 0 |
| 15 | >10000 | 3 | 10 | 0.1 | 0.1 | 0 | 0 |
| 16 | >10000 | 2 | 18 | 0.1 | 0.1 | 0 | 0 |
| 17 | >10000 | 8 | 14 | 0.1 | 0.1 | 0 | 0 |
| 18 | >10000 | 4 | 20 | 0.1 | 0.1 | 0 | 0 |
| 19 | >10000 | 3 | 19 | 0.1 | 0.1 | 0 | 0 |
| 20 | >10000 | 6 | 18 | 0.1 | 0.1 | 0 | 0 |
| 21 | >10000 | −17 | −3 | 0.1 | 0.1 | 0 | 0 |
| 22 | 1200 | −6 | −25 | 0.1 | 0.1 | 4 | 2.8 |

Sample numbers 2, 3, 5, 8, and 10 to 21 with the Si content within the range of 0.1 to 10 parts by mol and the Mn/Sr molar ratio within the range of 0.3 to 3.2, have no defectives in terms of moisture resistance in the PCBT test, and it has been thus determined that favorable moisture resistance is achieved.

What is claimed is:

1. A laminated ceramic capacitor comprising:
   a laminated body comprising dielectric ceramic layers including crystal grains and crystal grain boundaries, and comprising internal electrode layers; and
   an external electrode on a surface of the laminated body, and electrically connecting the internal electrode layers exposed at the surface of the laminated body,
   wherein the laminated body has a composition including a calcium zirconate based perovskite-type compound as a main constituent, and
   further including Mn, Sr, and Si, and
   when the laminated body is dissolved,
   Si contained therein is 0.1 parts by mol or more and 10 parts by mol or less with respect to 100 parts by mol of Zr, and
   a molar ratio of Mn to Sr is 0.3 or more and 3.2 or less.

2. The laminated ceramic capacitor according to claim 1, wherein a main constituent of the internal electrode layers is Cu.

3. The laminated ceramic capacitor according to claim 1, wherein the internal electrode layers include a plurality of first internal electrodes layers and a plurality of second internal electrode layers, the external electrode is a first external electrode electrically connected to the plurality of first internal electrode layers, and the laminated ceramic capacitor further comprises a second external electrode electrically connected to the plurality of second internal electrode layers.

4. The laminated ceramic capacitor according to claim 3, wherein the first and second internal electrode layers are arranged alternately in a stacking direction of the laminated body.

5. A laminated ceramic capacitor comprising:
   a laminated body comprising dielectric ceramic layers including crystal grains and crystal grain boundaries, and comprising internal electrode layers; and
   an external electrode on a surface of the laminated body, and electrically connecting the internal electrode layers exposed at the surface of the laminated body,
   wherein the dielectric ceramic layers have a composition including a calcium zirconate based perovskite-type compound as a main constituent, and
   further including Mn, Sr, and Si, and
   the dielectric ceramic layers have a composition in which, Si contained therein is 0.1 parts by mol or more and 10 parts by mol or less with respect to 100 parts by mol of Zr, and
   a molar ratio of Mn to Sr is 0.3 or more and 3.2 or less.

6. The laminated ceramic capacitor according to claim 5, wherein a main constituent of the internal electrode layers is Cu.

7. The laminated ceramic capacitor according to claim 5, wherein the internal electrode layers include a plurality of first internal electrodes layers and a plurality of second internal electrode layers, the external electrode is a first external electrode electrically connected to the plurality of first internal electrode layers, and the laminated ceramic capacitor further comprises a second external electrode electrically connected to the plurality of second internal electrode layers.

8. The laminated ceramic capacitor according to claim 7, wherein the first and second internal electrode layers are arranged alternately in a stacking direction of the laminated body.

9. A method for manufacturing a laminated ceramic capacitor, the method comprising:
   providing a main constituent powder containing a calcium zirconate based perovskite-type compound as a main constituent;
   providing a Mn compound, a Sr compound, and a Si compound,
   mixing the main constituent powder, the Mn compound, the Sr compound, and the Si compound to obtain a ceramic slurry;
   forming ceramic green sheets from the ceramic slurry;
   stacking the ceramic green sheets and internal electrode layers to form an unfired laminated body; and
   firing the unfired laminated body to form a laminated body,
   wherein Si contained in the ceramic green sheets is 0.1 parts by mol or more and 10 parts by mol or less with respect to 100 parts by mol of Zr, and
   a molar ratio of Mn to Sr is 0.3 or more and 3.2 or less.

10. The method for manufacturing a laminated ceramic capacitor according to claim 9, wherein a main constituent of the internal electrode layers is Cu.

* * * * *